United States Patent
Mizushima et al.

(10) Patent No.: US 9,348,825 B2
(45) Date of Patent: May 24, 2016

(54) SERVER AND METHOD FOR CAUSING TERMINAL TO DISPLAY SCREEN

(71) Applicant: DeNA Co., Ltd., Tokyo (JP)

(72) Inventors: Sota Mizushima, Tokyo (JP); Yosuke Hatanaka, Tokyo (JP); Manabu Sato, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/612,203

(22) Filed: Feb. 2, 2015

(65) Prior Publication Data

US 2015/0220542 A1    Aug. 6, 2015

(30) Foreign Application Priority Data

Feb. 3, 2014    (JP) ................... 2014-018339

(51) Int. Cl.
   *G06F 17/30*    (2006.01)
   *G06K 9/52*    (2006.01)
(52) U.S. Cl.
   CPC .... *G06F 17/30076* (2013.01); *G06F 17/30035* (2013.01); *G06F 17/30247* (2013.01); *G06K 9/52* (2013.01)
(58) Field of Classification Search
   CPC .................. G06F 17/30; G06F 17/00
   USPC .................. 707/600–899
   See application file for complete search history.

(56) References Cited

U.S. PATENT DOCUMENTS

| 8,861,532 B2 | 10/2014 | Jang et al. |
| 2008/0313290 A1* | 12/2008 | Park ............... H04N 1/00214 709/206 |

FOREIGN PATENT DOCUMENTS

| JP | 2008-176649 | 7/2008 |
| JP | 2013-115824 | 6/2013 |

OTHER PUBLICATIONS

Japanese Office Action issued on May 27, 2014 in Japanese Patent Application No. 2014-018339, and English translation thereof.
Japanese Office Action issued on Aug. 12, 2014 in Japanese Patent Application No. 2014-018339, and English translation thereof.

* cited by examiner

*Primary Examiner* — Isaac M Woo
(74) *Attorney, Agent, or Firm* — Pillsbury Winthrop Shaw Pittman LLP (57) ABSTRACT

One object is to shorten the time required for a terminal to display a screen including images. A server according to an embodiment includes: a storage unit for storing information; and a display control unit for causing, in response to a display request for displaying the screen from the terminal, the terminal to display the screen including the images corresponding to the image files by using the image files stored on the storage of the terminal or the image files stored on the storage of the server selected in accordance with a predetermined selection condition based at least on the throughput of the terminal and the communication capacity between the server and the terminal.

4 Claims, 5 Drawing Sheets

| Image Size \ Terminal Model | Model A | Model B | ... |
|---|---|---|---|
| 501 KByte~ | 16Mbps | 8Mbps | ... |
| 201~500 KByte | 14Mbps | 6Mbps | ... |
| ~200 KByte | 12Mbps | 4Mbps | ... |

Fig. 5

SERVER AND METHOD FOR CAUSING TERMINAL TO DISPLAY SCREEN

CROSS-REFERENCE TO RELATED APPLICATIONS

This application is based on and claims the benefit of priority from Japanese Patent Application Serial No. 2014-018339 (filed on Feb. 3, 2014), the contents of which are hereby incorporated by reference in their entirety.

TECHNICAL FIELD

The present invention relates to a server and a method for causing a terminal to display a screen, and in particular, to a server which is communicatably connected to a terminal having a terminal storage storing image files corresponding to images included in a screen and causes the terminal to display the screen, and a method therefor.

BACKGROUND

Various digital contents such as games have recently been provided through applications or web browsers performed on terminals such as smartphones. Such digital contents are provided with screens including various images displayed on the terminals. If, for example, the images included in the screens have high resolution, the data size of the corresponding image files is so large that it may take time to transferring the image files. Longer time required for transfer of the image files may prolong the time required for display of the screens.

Meanwhile, Japanese Patent Application Publication No. 2013-115824 proposes a method for determining the type of a network to which a terminal is connected, based on a round trip time of a packet transmitted and received between the terminal and a server. It may be possible to shorten the time required for transferring image files by applying the above method to display of a screen including images such that the image files are transferred in accordance with the type of a network to which a terminal is connected.

The above method, however, is not specific as to how to apply the result of determining the type of a network to display of a screen. Also, since display of a screen including images involves various processes other than transfer of image files, a method based only on the type of a network may not sufficiently shorten the total time required for displaying the screen. Accordingly, there is a demand for a concrete setup for shorten the total time required for displaying a screen including images based on various information which possibly impacts on display of the screen.

SUMMARY

One object of the embodiments of the present invention is to shorten the time required for causing a terminal to display a screen including images. Other objects of the present disclosure will be apparent with reference to the entire description in this specification.

A server according to an embodiment of the present invention is a server for causing a terminal to display a screen, the server communicatably connected to the terminal having a terminal storage storing one or more image files corresponding to one or more images included in the screen, the server comprising: a server storage storing one or more image files corresponding to one or more images included in the screen; and one or more physical processors configured to execute instructions, wherein the one or more physical processors execute the instructions to implement a display control for causing, in response to a display request for displaying the screen from the terminal, the terminal to display the screen including the images corresponding to the image files by using the image files stored on the terminal storage or the image files stored on the server storage selected in accordance with a predetermined selection condition based at least on a throughput of the terminal and a communication capacity between the server and the terminal.

A method according to an embodiment of the present invention is a method for a server to cause a terminal to display a screen, the server having a server storage storing one or more image files corresponding to one or more images included in the screen, the server communicatably connected to the terminal having a terminal storage storing one or more image files corresponding to one or more images included in the screen, the method comprising the steps of: causing, in response to a display request for displaying the screen from the terminal, the terminal to display the screen including the images corresponding to the image files by using the image files stored on the terminal storage or the image files stored on the server storage selected in accordance with a predetermined selection condition based at least on a throughput of the terminal and a communication capacity between the server and the terminal.

Various embodiments of the present invention shorten the time required for causing a terminal to display a screen including images.

DESCRIPTION OF EXAMPLE EMBODIMENTS

Figure 1:
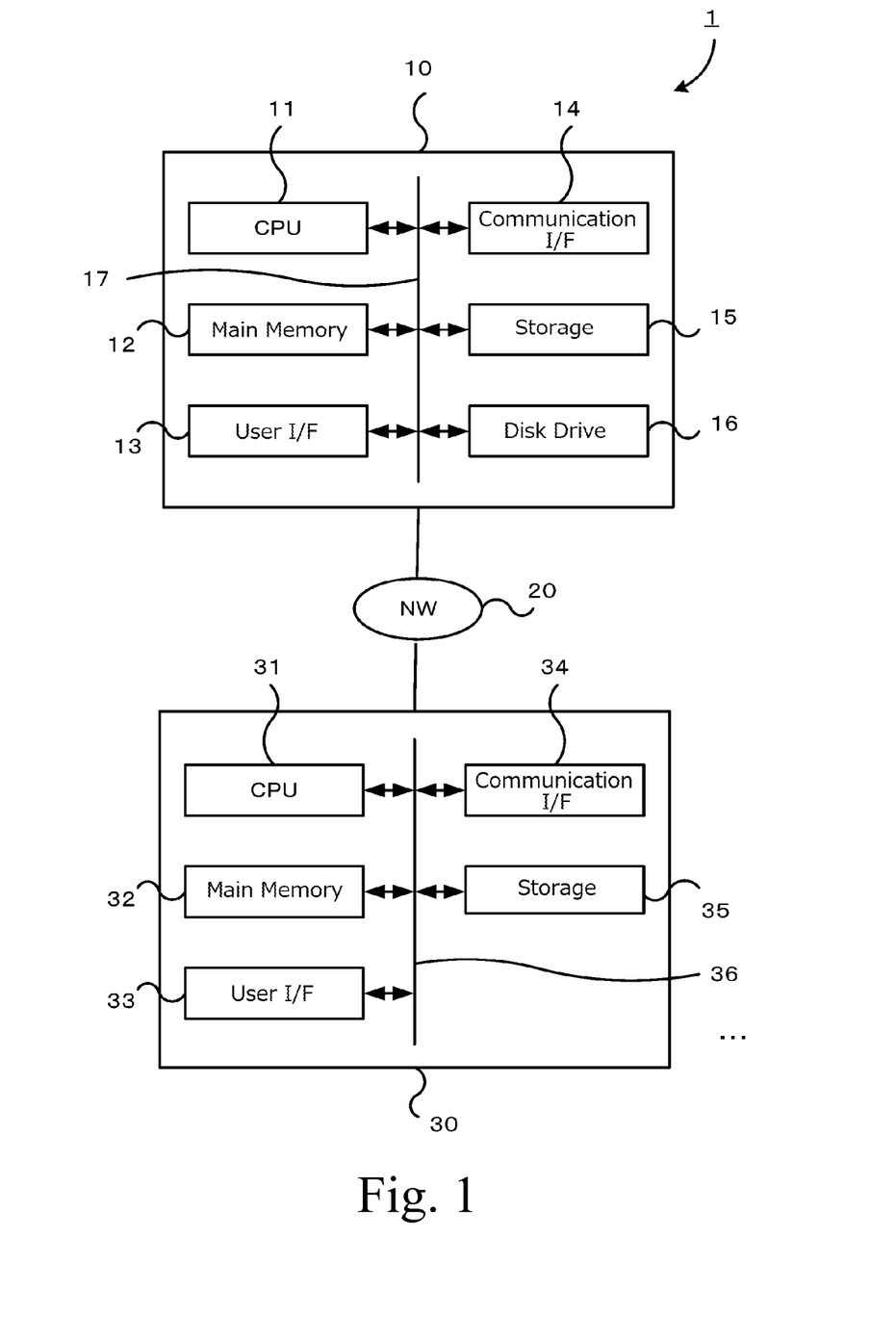
FIG. 1 is a block diagram schematically illustrating a network configuration of a system 1 including a server 10 according to an embodiment of the present invention.

FIG. 1 is a block diagram schematically illustrating a network configuration of a system 1 including a server 10 according to an embodiment of the present invention. As shown in FIG. 1, the server 10 according to an embodiment may be communicatively connected via a communication network 20 such as the Internet to a plurality of terminals 30 configured as conventional computers; and the server 10 may provide various Internet services to the terminals 30 and cause the terminals 30 to display various screens used in the Internet services. The Internet services provided by the server 10 may include services for providing digital contents such as games, and platform services (SNS services) for implementing various communications between a plurality of users each operating a terminal 30 (e.g., chat (MiniMail), circle, avatar, diary, message board, greeting, telephone call), but are not limited thereto.

As shown, the server 10 may include a central processing unit (CPU) (physical computer processor) 11, a main memory 12, a user interface (I/F) 13, a communication I/F 14, a storage 15, and a disk drive 16, and these components may be electrically connected to one another via a bus 17. The CPU 11 may load various programs into the main memory 12 from the storage 15, and may execute commands included in the loaded programs. The main memory 12 may be used to store a program to be executed by the CPU 11, and may be formed of, for example, a dynamic random access memory (DRAM).

The user I/F 13 may include, for example, an information input device such as a keyboard or a mouse for accepting an input from an operator, and an information output device such as a liquid crystal display for outputting calculation results of the CPU 11. The communication I/F 14 may be implemented as hardware, firmware, or communication software such as a transmission control protocol/Internet protocol (TCP/IP) driver or a point-to-point protocol (PPP) driver, or a combination thereof, and may be configured to be able to communicate with the terminals 30 via the communication network 20.

The storage 15 may be formed of, for example, a magnetic disk drive and store various programs such as a control program for controlling the progress of various services provided by the server 10. The storage 15 may also store various data used in the various services. The various data that may be stored in the storage 15 may also be stored on a database server communicatively connected to the server 10 and physically separate from the server 10. The disk drive 16 may read data stored in a storage medium such as a compact disc read only memory (CD-ROM), digital versatile disc read only memory (DVD-ROM), or DVD Recordable (DVD-R) disc, or write data to such a storage medium.

In an embodiment, the server 10 may function as a web server for managing a web site including a plurality of hierarchical web pages and may be capable of providing the terminal 30 with various services via the web sites. The terminals 30 may fetch HTML data for rendering a web page from the server 10 and analyze the HTML data to present the web page to a user of the terminals 30. For example, a game provided through such a web page is sometimes called a browser game. The storage 15 may also store the HTML data for rendering the web page. The HTML data may comprise HTML documents written in markup languages such as HTML; the HTML documents may be associated with various images. Additionally, the HTML documents may include programs written in various script languages.

The storage 15 may also store application programs (hereinafter also referred to as "applications") to be executed on execution environments of the terminal 30 other than browser software. These applications may include programs for performing various processes and various data such as image files to be referred to for executing the programs. The programs may be created in, for example, object oriented languages such as Objective-C™ and Java™. The application stored on the storage 15 may be delivered to a terminal 30 in response to a delivery request. The application delivered from the server 10 may be received by the terminal 30 through a communication I/F 34 in accordance with the control of CPU 31; and the received application may be sent to a storage 35 and stored thereon. The application may be launched in accordance with the user's operation on the terminal 30 and may be executed on an execution environment implemented on the terminal 30 such as ngCore™ or Android™. The server 10 may provide the applications executed on the terminals 30 with various necessary data. Additionally, the server 10 can store various data sent from the terminal 30 for each user, thereby managing the statuses of the various services such as progress of games for each user.

Thus, the server 10 may manage the web site for providing various services and deliver web pages constituting the web site in response to a request from the terminal 30, thereby providing various services. Also, the server 10 can provide various services based on communication with an application performed on the terminal device 30 in place of, or in addition to, such browser-based services. Briefly, the server 10 may also include a function to authenticate a user at start of various services and perform charging process in accordance with provision of various services.

In an embodiment, the terminal 30 may be any information processing device that may display on a web browser a web page of a web site obtained from the server 10 and include an application executing environment for executing applications; and the terminals 30 may include personal computers, smartphones, tablet terminals, and game-dedicated terminals.

As shown, the terminal 30 may include a central processing unit (CPU) (physical computer processor) 31, a main memory 32, a user interface (I/F) 33, a communication I/F 34, and a storage 35, and these components may be electrically connected to one another via a bus 36.

The CPU 31 may load various programs into the main memory 32 from the storage 35, and may execute commands included in the loaded programs. The main memory 32 may be used to store a program to be executed by the CPU 31, and may be formed of, for example, a dynamic random access memory (DRAM).

The user I/F 33 may include an information input device for receiving user inputs and an information output device for outputting an operation result of CPU 31; and the user I/F may include a display device such as a liquid crystal display having a touch panel.

The communication I/F 34 may be implemented as hardware, firmware, or communication software such as a transmission control protocol/Internet protocol (TCP/IP) driver or a point-to-point protocol (PPP) driver, or a combination thereof, and may be configured to be able to communicate with the server 10 via the communication network 20.

The storage 35 may be constituted by, for example, a magnetic disk drive or a flash memory and store various programs such as an operating system and an application program and various data processed by these programs (e.g., image files included in the application programs). The storage 35 may include a built-in storage and a removable storage. A removable storage may include, for example, an SD memory card having a built-in flash memory.

A terminal 30 having such an architecture may include, for example, browser software for interpreting HTML data and rendering a screen; this browser software may enable the terminal 30 to interpret the HTML data fetched from the server 10 and render web pages corresponding to the received HTML data. Further, the terminal 30 may include plug-in software embedded into browser software; therefore, the terminal 30 can fetch from the server 10 or another server a SWF file embedded in HTML data and execute the SWF file by using the browser software and the plug-in software.

When browser software or an application program is executed on the terminal 30, for example, animation or an operation icon designated by the program may be displayed on the terminal 30. A user can input various instructions via a user I/F 33 of the terminal 30. The instruction entered by the user may be transmitted to the server 10 through the browser of the terminal 30 or a function of an execution environment such as ngCore™.

At least part of the plurality of application programs executed on the terminal 30 may have a region (WebView region) for rendering a screen corresponding to a web page based on interpreted HTML data, and the region may be located in at least part of a screen region displayed on the terminal 30. Application programs having the WebView region may make a request to the server 10 for rendering the WebView region and may render the other regions of the screen on the terminal 30 (without making a request to the server 10).

Figure 2:
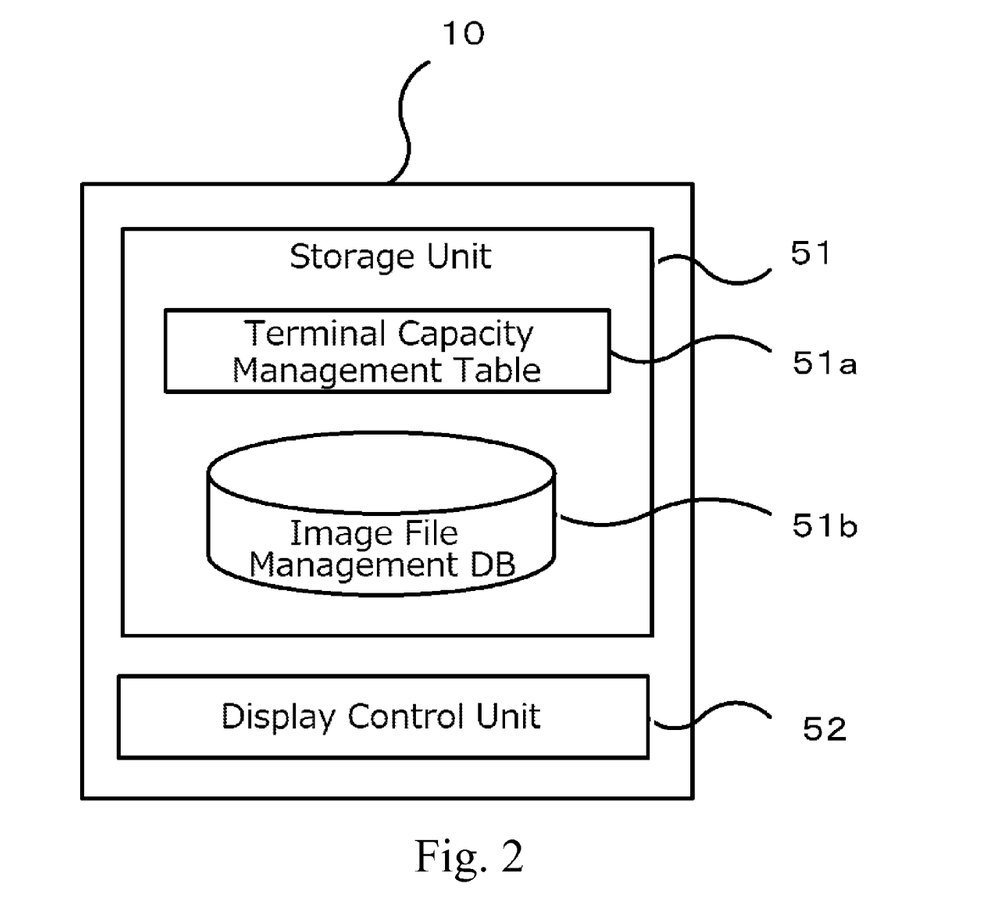
FIG. 2 is a block diagram illustrating the functionality of the server 10 according to an embodiment.

Next, functionality of the server 10 according to an embodiment will be described. FIG. 2 is a block diagram illustrating the functionality of the server 10 according to an embodiment. As shown, the server 10 in an embodiment may comprise: a storage unit 51 for storing information; and a display control unit 52 for causing, in response to a display request for displaying a screen from the terminal 30, the terminal 30 to display the screen including the images corresponding to the image files by using the image files stored on the storage 35 of the terminal 30 (the terminal storage) or the image files stored on the storage 15 of the server 10 (the server storage) selected in accordance with a predetermined selection condition based at least on the throughput of the terminal 30 and the communication capacity between the server 10 and the terminal 30. The above functionality may be implemented by cooperation between CPU 11 and various programs and tables stored on main memory 12 and storage 15. An example of such cooperation may be execution of instructions included in a loaded program by CPU 11.

Figure 3:
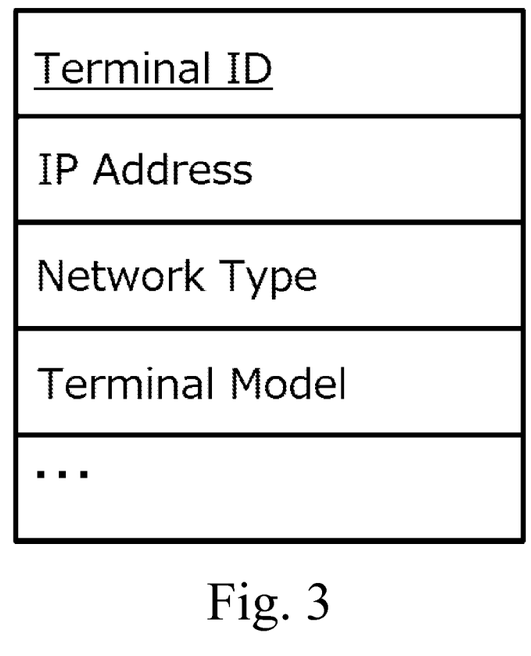
FIG. 3 is a diagram showing an example of information managed by a terminal capacity management table according to an embodiment.

The storage unit 51 according to an embodiment may be implemented by the storage 15, etc. and include a terminal capacity management table 51a for managing information related to the throughput and communication capacity of the terminal 30 communicatably connected to the server 10, and an image file management database 51b for managing image files corresponding to images included in screens to be displayed on the terminal 30. FIG. 3 is a diagram showing an example of information managed by a terminal capacity management table 51a according to an embodiment. As shown, the terminal capacity management table 51a may associate "a terminal ID" identifying a terminal 30 with "an IP address" assigned to the terminal 30, "a network type" identifying the type of a network mediating the communication between the terminal 30 and the server 10, "a terminal model" identifying the model of the terminal 30, and other information. The "network type" may contain a value representing "WiFi," "3G," "LTE," or the like. The network type can be specified by, e.g., an IP address assigned to the terminal 30. The "terminal model" may contain a value representing a model name specifying the manufacturer, model, operating system, etc. of the terminal 30. The model name may be obtained from, e.g., information related to the model name obtained by the function of the operation system of the terminal 30. The information managed by the terminal capacity management table 51a may be recorded by the server 10 at the timing when the terminal 30 communicatably connects itself to the server 10. The information managed by the terminal capacity management table 51a may be updated at regular intervals or at desired timings.

The image file management database 51b according to an embodiment may store the image files corresponding to the images included in the screens to be displayed on the terminal 30 and manage information related to the image files (e.g., data size). The image file management database 51b may reside on a device communicatable with the server 10 other than the storage 15.

Figure 4:
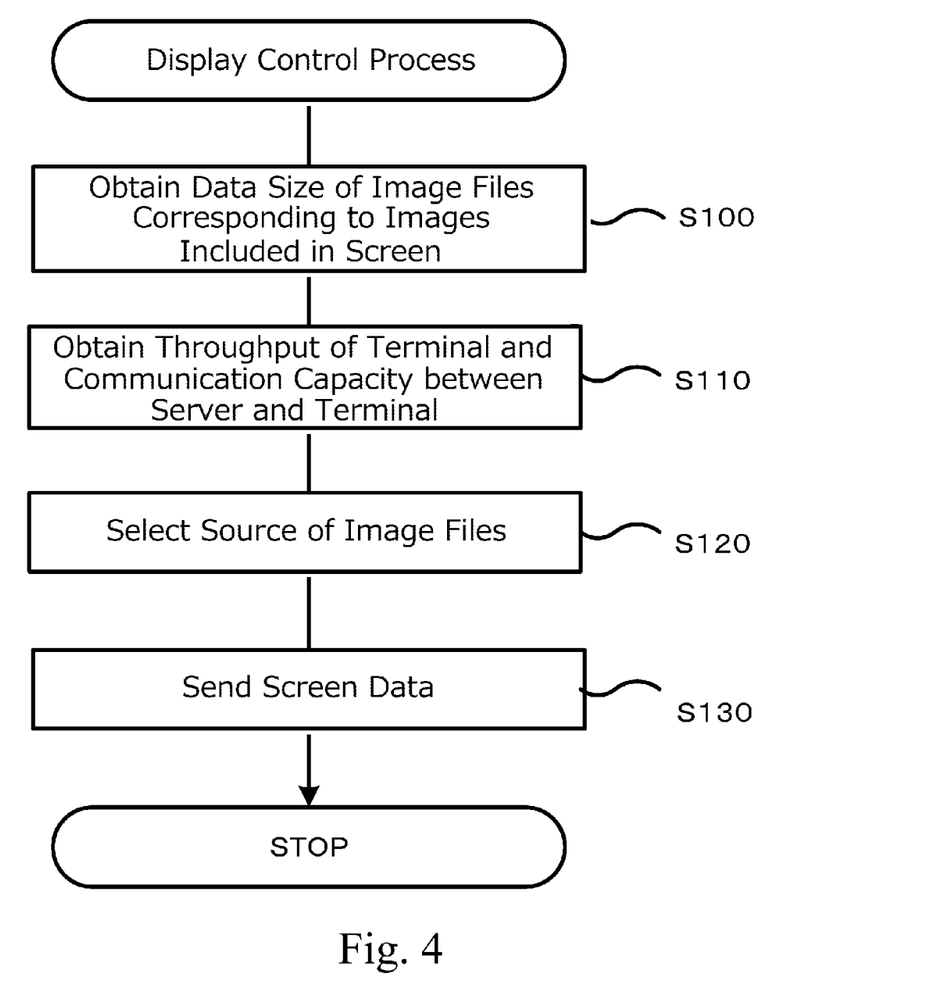
FIG. 4 is a flow diagram showing an example of a display control process according to an embodiment.

Next, operations of such a server 10 according to an embodiment will now be described. FIG. 4 is a flow diagram showing an example of a display control process performed by the server 10 in an embodiment. The display control process may be performed by the display control unit 52 of the server 10 when the server 10 receives a display request for displaying a screen from the terminal 30. When, for example, an application program installed on the terminal 30 is executed and accordingly an initial screen such as a login screen is to be displayed on the terminal 30, the terminal 30 may make, to the server 10, a display request for displaying a screen in the WebView region constituting a part of the screen region of the initial screen.

As shown, the first step in the display control process may be to obtain the data size of an image file corresponding to the image included in the screen for which a display request has been made (step S100). In an embodiment as described above, the data size of the image file may be managed by the image file management database 51b; and the server 10 may obtain from the image file management database 51b the data size of each of the one or more image files corresponding to the one or more images included in the screen for which the display request has been made.

The second step may be to obtain information related to the throughput of the terminal 30 which has made the display request of the screen and the communication capacity between the server 10 and the terminal 30 (step S110). More specifically, in an embodiment, the server 10 may obtain the value of "terminal model" managed by the terminal capacity management table 51a as the information related to the throughput of the terminal 30 which has made the display request of the screen, and obtain the value of "network type" also managed by the terminal capacity management table 51a as the information related to the communication capacity between the server 10 and the terminal 30.

After obtaining the data size of each of the image files corresponding to the images included in the screen, the information related to the throughput of the terminal 30, and the information related to the communication capacity between the server 10 and the terminal 30, the server 10 may select, based on the above information, the terminal 30 (in particular, the storage 35, etc.) or the server 10 (in particular, the storage 15) as the source of the image files to be used by the terminal 30 for displaying the screen (step S120). Various selection conditions may be applied to selection of the source of the image files based on the data size of the image files, the throughput of the terminal 30, and the communication capacity between the server 10 and the terminal 30. An applicable selection condition may be, for example, that any one of the terminal 30 and the server 10 should be selected as the source of the image files such that the expected time required for the terminal 30 to obtain the image files from the source and display the corresponding images (the total time required for displaying the images) is smaller.

A specific example will be described of the selection conditions that any one of the two should be selected as the source of the image files such that the total expected time required for the terminal 30 to display the images is smaller. In an embodiment, when the terminal 30 displays the images included in the screen, the terminal 30 may render and display image files subjected to an encoding process (a predetermined conversion process such as base 64 encoding) (such image files may be hereinafter referred to as "encoded image files"). The encoding process on the image files may be performed on the terminal 30 when the source of the image files is the terminal 30 or may be performed on the server 10 when the source of the image files is the server 10. If the source of the image files is the terminal 30, the total time required for displaying the images corresponding to the image files may be the total of the following amounts of time.

(1) The total time required if the source of the image files is the terminal 30
  (1-1) The time for reading the image files from the storage 35, etc.
  (1-2) The time for encoding the image files
  (1-3) The time for rendering the encoded image files
Alternatively, if the source of the image files is the server 10, the time required for displaying the images corresponding to the image files may be the total of the following amounts of time.
(2) The total time required if the source of the image files is the server 10
  (2-1) The time for transferring the encoded image files from the server 10
  (2-2) The time for rendering the encoded image files
Among these amounts of time, it is possible to focus on, for example, "(1-2) the time for encoding the image files" and "(2-1) the time for transferring the encoded image files" which may largely impact on the total required time. The selection condition may be that, if "(1-2) the time for encoding the image files" is smaller than the other, the terminal 30 should be selected as the source, or if "(2-1) the time for transferring the encoded image files" is smaller, the server 10 should be selected as the source.

"(1-2) The time for encoding the image files" can be calculated from, e.g., a formula of "the data size of the image files divided by the throughput of the terminal 30"; and "(2-1) the time for transferring the encoded image files" can be calculated from, e.g., a formula of "the data size of the encoded image files divided by the communication capacity between the server 10 and the terminal 30." Further, the data size of "the encoded image files" can be calculated based on the data size of the original image files (the image files yet to be encoded). (For base 64 encoding for example, the data size of the encoded image files may be 4/3 times (about 1.3 times) the data size of the original image files.) Additionally, the throughput of the terminal 30 may be previously set to the data size that can be encoded in a unit time for each "terminal model" described above, and the communication capacity between the server 10 and the terminal 30 may be previously set to the data size that can be transferred in a unit time (communication rate) for each "network type" described above; and thus "(1-2) the time for encoding the image files" and "(2-1) the time for transferring the encoded image files" can be calculated.

Since "(1-2) the time for encoding the image files" can be calculated from a formula of "the data size of the image files divided by the throughput of the terminal 30," "(1-2) the time for encoding the image files" is shorter as the throughput of the terminal 30 is higher. Accordingly, this selection condition may make the terminal 30 more likely to be selected as the source of the image files as the terminal 30 has a higher throughput. On the other hand, since "(2-1) the time for transferring the encoded image files" can be calculated from a formula of "the data size of the encoded image files divided by the communication capacity between the server 10 and the terminal 30," "(2-1) the time for transferring the encoded image files" is shorter as the communication capacity between the server 10 and the terminal 30 is higher. Accordingly, this selection condition may make the server 10 more likely to be selected as the source of the image files as the communication capacity between the server 10 and the terminal 30 is higher. Further, "(2-1) the time for transferring the encoded image files" can be calculated from a formula of "the data size of the encoded image files divided by the communication capacity between the server 10 and the terminal 30." In an embodiment, the data size of the encoded image files may be the data size of the original image files multiplied by a predetermined factor (e.g., 1.3). Accordingly, the variation of the amount of time increasing with the data size of the original image files may be larger for "(2-1) the time for transferring the encoded image files" calculated from a formula of "the data size of the encoded image files divided by the communication capacity between the server 10 and the terminal 30" than for "(1-2) the time for encoding the image files" calculated from a formula of "the data size of the image files divided by the throughput of the terminal 30." That is, this selection condition may make the terminal 30 more likely to be selected as the source of the image files as the data size of the image files is larger.

Figure 5:
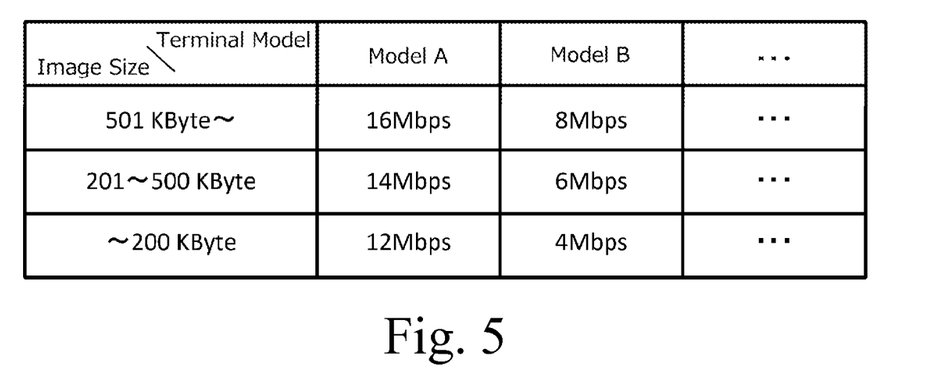
FIG. 5 shows examples of selection condition of a source of an image file according to an embodiment.

It may be also possible that, instead of comparing the expected required time, the source of the image files should be previously set for each combination of the data size of the image files, the throughput of the terminal 30 (more specifically, "terminal model"), and the communication capacity between the server 10 and the terminal 30 (more specifically, "network type"), and the source of the image files should be selected in accordance with the setting. FIG. 5 shows an example of a selection condition table managing the selection conditions of the source of the image files previously set. In the example shown, a communication rate used as a reference value applied to selection of the source of the image files may be set for each combination of the range of the data size of the image files and the "terminal model" of the terminal 30. As shown, if, e.g., the data size of the image files is "equal to or greater than 501 KByte" and the "terminal model" of the terminal 30 is "model A," the reference value of the communication rate may be set to 16 Mbps. Further, if the communication rate corresponding to the "network type" between the server 10 and the terminal 30 (previously set for each "network type") is equal to or greater than this reference value, the server 10 may be selected as the source of the image files; otherwise, the terminal 30 may be selected as the source of the image files.

In the example shown in FIG. 5, the reference values of the communication rate are higher for "model A" than for "model B." Therefore, the terminal 30 of "model A" may be more likely to be selected as the source of the image files than that of "model B." This is because "model A" may have a higher throughput than "model B" (e.g., a higher CPU performance). That is, as described above, this selection condition may make the terminal 30 more likely to be selected as the source of the image files as the terminal 30 has a higher throughput; therefore, "model A" having a higher throughput may be assigned a higher reference value of the communication rate and assigned a higher communication rate corresponding to the "network type" (equal to or greater than a higher reference value) than "model B." Thus, the terminal 30 may be selected as the source of the image files except in the case where "(2-1) the time for transferring the encoded image files" described above is largely reduced.

In an embodiment, if a screen for which a display request has been made includes a plurality of images, a source may be selected for each of the image files corresponding to the plurality of images, respectively. Therefore, the sources of the image files may be different among the plurality of images included in the screen.

After the source of the image files is thus selected, the server 10 may generate screen data and sent it to the terminal 30 (step S130), and end the display control process. In an embodiment, screen data of a screen sent to the terminal 30 may include instructions for causing the terminal 30 to display the screen by using the image files stored on the source selected in step S120. More specifically, when the server 10 is selected as the source (image files stored on the server 10 are used), encoded image files (e.g., data constituted by alphanumeric characters) subjected to an encoding process (e.g., base 64 encoding) by the server 10 may be added to the screen data (e.g., HTML data) to be sent to the terminal 30; or when the terminal 30 is selected as the source (image files stored on the terminal 30 are used), information indicating that the source of the image files is the terminal 30 may be added to the screen data to be send to the terminal 30. The terminal 30 may receive the screen data from the server 10, and render a screen using the encoded image files added to the received screen data in accordance with the above-described instructions, or render a screen after encoding the image files read from the storage 35 of the terminal 30, thereby to display the screen including the images corresponding to the image files. Since such a process for displaying a screen is conventional to those skilled in the art, further detailed description thereof will be omitted.

In the above-described embodiment, a source may be selected for each of image files corresponding to a plurality of images included in a screen; but it is not necessary to select a source for each of all of the plurality of image files. For example, it may also be possible that a source is selected only for image files having a large data size (equal to or greater than a predetermined threshold value) in accordance with the above-described selection condition; and for image files having a small data size (less than the predetermined threshold value), the source is uniformly one of the terminal 30 and the server 10 (e.g., the server 10). Alternatively, it may also be possible that one source is selected for a plurality of image files included in a screen (the source is uniformed for the plurality of image files) based on the result of selection of a source for each of the image files corresponding to the plurality of images included in the screen (for example, the source is uniformed to either one selected for a larger number of image files). Further, it may also be possible that one source is selected for a plurality of image files included in a screen based on the total of the data sizes of the plurality of image files.

As described above, in response to a display request for displaying a screen from the terminal 30, the server 10 in an embodiment may cause the terminal 30 to display the screen including the images corresponding to the image files by using the image files stored on the terminal 30 (the terminal storage 35) or the image files stored on the server 10 (the server storage 15) selected in accordance with a predetermined selection condition based at least on the throughput of the terminal 30 and the communication capacity between the server 10 and the terminal 30. Accordingly, a screen can be displayed by using image files stored on the more suitable source selected based on the throughput of the terminal 30 and the communication capacity between the server 10 and the terminal 30. As a result, the time required for the terminal 30 to display the screen including the images can be shortened.

Further, the server 10 in an embodiment may select a source of image files based on the data size of the image files in addition to the throughput of the terminal 30 and the communication capacity between the server 10 and the terminal 30; therefore, a screen can be displayed by using image files stored on a more suitable source. An example of the case where a screen can be displayed by using image files stored on the more suitable source may be when variation of the data size of an original image file is different from the variation of the data size of the image file subjected to a predetermined conversion process (e.g., an encoding process such as base 64 encoding in an embodiment) and the predetermined conversion process differs in accordance with the source of the original image file (in an embodiment, the encoding process may be performed on the terminal 30 if the source of the original image file is the terminal 30, and the encoding process may be performed on the server 10 if the source is the server 10).

In an embodiment, a source of an image file may be selected based on the data size of the image file in addition to the throughput of the terminal 30 and the communication capacity between the server 10 and the terminal 30; but it may also be possible to select a source of an image file based on the throughput of the terminal 30 and the communication capacity between the server 10 and the terminal 30 irrespective of the data size of the image file.

In an embodiment, information related to the throughput of the terminal 30 is "terminal model" and information related to the communication capacity between the server 10 and the terminal 30 is "network type." It may also be possible to apply, in place of or in addition to these information pieces, other information related to the throughput of the terminal 30 and the communication capacity between the server 10 and the terminal 30. For example, the terminal 30 may obtain or measure a value indicating the throughput or communication capacity (e.g., latency or radio wave intensity), and the server 10 may obtain from the terminal 30 the value obtained or measured.

In an embodiment, the step of selecting a source of an image file (i.e., step S120 of the display control process) may be performed by the server 10; but this step can also be performed by the terminal 30. For example, the terminal 30 may have installed thereon a program implementing the algorithm according to the above selection condition for selecting a source of an image file. The server 10 may send, to the terminal 30, information related to the throughput of the terminal 30 and the communication capacity between the server 10 and the terminal 30, and the terminal 30 may execute the program, whereby the terminal 30 may perform the step of selecting a source of an image file. In this case, the terminal 30 may request the server 10 to send the image file (or encoded image file) if the server 10 is selected as the source of the image file.

The processes and procedures described and illustrated herein may also be implemented by software, hardware, or any combination thereof other than those explicitly stated for the embodiments. More specifically, the processes and procedures described and illustrated herein may be implemented by the installation of the logic corresponding to the processes into a medium such as an integrated circuit, a volatile memory, a non-volatile memory, a magnetic disk, or an optical storage. The processes and procedures described and illustrated herein may also be installed in the form of a computer program, and executed by various computers.

Even if the processes and the procedures described herein are executed by a single apparatus, software piece, component, or module, such processes and procedures may also be executed by a plurality of apparatuses, software pieces, components, and/or modules. Even if the data, tables, or databases described herein are stored in a single memory, such data, tables, or databases may also be dispersed and stored in a plurality of memories included in a single apparatus or in a plurality of memories dispersed and arranged in a plurality of apparatuses. The elements of the software and the hardware described herein can be integrated into fewer constituent elements or can be decomposed into more constituent elements.

With respect to the use of substantially any plural and/or singular terms herein, those having skill in the art can translate from the plural to the singular and/or from the singular to the plural as is appropriate to the context.

What is claimed is:

1. A server for causing a terminal to display a screen, the server communicatably connected to the terminal having a terminal storage storing one or more image files corresponding to one or more images included in the screen, the server comprising:

a server storage storing one or more image files corresponding to one or more images included in the screen; and one or more physical processors configured to execute instructions, wherein the one or more physical processors execute the instructions to implement a display control for causing, in response to a display request for displaying the screen from the terminal, the terminal to display the screen including the images corresponding to the image files by using the image files stored on the terminal storage or the image files stored on the server storage selected in accordance with a predetermined selection condition based at least on a throughput of the terminal and a communication capacity between the server and the terminal, when the image files stored on the server storage are used, the display control subjects the image files to a predetermined conversion process and send the converted image files to the terminal, when the image files stored on the terminal storage are used, the terminal subjects the image files to the predetermined conversion process and displays the screen by using the converted image files, and when the image files stored on the server storage are used, the terminal displays the screen by using the converted image files sent from the display control, and the predetermined selection condition makes the image files stored on the terminal storage more likely to be selected as the throughput is higher and makes the image files stored on the server storage more likely to be selected as the communication capacity is higher.

2. The server of claim 1, wherein the predetermined selection condition is based on data size of the image files corresponding to the images included in the screen in addition to the throughput and the communication capacity, and makes the image files stored on the terminal storage more likely to be selected as the data size of the image files is larger.

3. The server of claim 1, wherein the screen is displayed in at least a part of a display region displayed in accordance with execution of an application program executable on the terminal, and the terminal storage stores the image files included in the application program.

4. A method for a server to cause a terminal to display a screen, the server having a server storage storing one or more image files corresponding to one or more images included in the screen, the terminal having a terminal storage storing one or more image files corresponding to one or more images included in the screen, the server being communicatably connected to the terminal, the method comprising the step of:

causing, in response to a display request for displaying the screen from the terminal, the terminal to display the screen including the images corresponding to the image files by using the image files stored on the terminal storage or the image files stored on the server storage selected in accordance with a predetermined selection condition based at least on a throughput of the terminal and a communication capacity between the server and the terminal, wherein, when the image files stored on the server storage are used, the step of causing the terminal to display the screen includes subjecting the image files to a predetermined conversion process and sending the converted image files to the terminal, when the image files stored on the terminal storage are used, the terminal subjects the image files to the predetermined conversion process and displays the screen by using the converted image files, and when the image files stored on the server storage are used, the terminal displays the screen by using the converted image files sent from the server, and the predetermined selection condition makes the image files stored on the terminal storage more likely to be selected as the throughput is higher and makes the image files stored on the server storage more likely to be selected as the communication capacity is higher.

* * * * *